(12) United States Patent
Shak et al.

(10) Patent No.: US 9,892,467 B2
(45) Date of Patent: Feb. 13, 2018

(54) SYSTEM AND METHOD FOR IMPLEMENTING CHARGE CENTRIC BILLING

(71) Applicant: NetSuite Inc., San Mateo, CA (US)

(72) Inventors: Dennis Paul Shak, Saratoga, CA (US); Jeremy John Blanchard, San Carlos, CA (US); Andrew Owen Vincent, Knowle Fareham (GB); Peter Fung, San Mateo, CA (US); Xiaozheng (Michael) Ye, Foster City, CA (US); Stephen Clode, San Jose, CA (US)

(73) Assignee: NetSuite Inc., San Mateo, CA (US)

( * ) Notice: Subject to any disclaimer, the term of this patent is extended or adjusted under 35 U.S.C. 154(b) by 140 days.

(21) Appl. No.: 14/708,039

(22) Filed: May 8, 2015

(65) Prior Publication Data

US 2017/0236213 A1    Aug. 17, 2017

Related U.S. Application Data

(60) Provisional application No. 61/990,596, filed on May 8, 2014.

(51) Int. Cl.
*G07B 17/00* (2006.01)
*G06Q 40/00* (2012.01)
*G06Q 10/10* (2012.01)

(52) U.S. Cl.
CPC ............ *G06Q 40/12* (2013.12); *G06Q 10/10* (2013.01)

(58) Field of Classification Search
CPC ........ G06Q 10/00; G06Q 40/12; G06Q 10/10; G06F 17/30

USPC ............................................ 700/107; 705/30
See application file for complete search history.

(56) References Cited

U.S. PATENT DOCUMENTS

| | | | | |
|---|---|---|---|---|
| 7,444,672 | B2* | 10/2008 | Ellmore | G06Q 20/108 705/42 |
| 8,224,666 | B1* | 7/2012 | Watt | G06Q 30/04 705/1.1 |
| 2005/0004867 | A1* | 1/2005 | Spector | G06Q 20/00 705/39 |
| 2010/0076776 | A1* | 3/2010 | Kopko | G06Q 30/02 705/14.1 |

* cited by examiner

*Primary Examiner* — Rokib Masud
(74) *Attorney, Agent, or Firm* — Cooper Legal Group, LLC

(57) ABSTRACT

Methods, systems, and apparatuses for improving the handling and interaction of charge events in a business using services of a multi-tenant computing platform, such as accounting, CRM, ERP, and the like. Embodiments are directed to implementing and using a charge record to enable efficient use of charges originating from multiple sources to generate reports and forecasts for multiple other services and/or recipients. In one embodiment, the charge record defines a single-source of data which enables maintaining critical business information in synchronization through a single repository of data. One aspect is to define a single abstraction, the charge record, which all sources can create. Thus, instead of multiple relationship between multiple sources and multiple processes, a charge record provides a single data point for a charge such that charges sources and processes that utilize data from the charge sources may interact using a single type of data record.

20 Claims, 5 Drawing Sheets

SYSTEM AND METHOD FOR IMPLEMENTING CHARGE CENTRIC BILLING

PRIORITY CLAIM

This application claims the benefit of U.S. Provisional Application No. 61/990,596, entitled "System and Method for Implementing Charge Centric Billing," filed May 8, 2014, which is incorporated by reference in its entirety herein for all purposes.

BACKGROUND

In a business environment, a business may receive revenue through various charges to customers and/or clients. Often, a business may have multiple sources for charges, e.g., sales orders, manual invoices, projects, subscriptions, CSV Imports, and other third party rating engines. Having such disparate sources for charges, using conventional approaches to reconcile these charges becomes very difficult and complicated as it is nearly impossible to reconcile billing, revenue, reports and forecast data that are coming from multiple sources. Conventional approaches to using charge data originating from multiple sources are not convenient or effective for purposes of generating certain types of reports and forecasts.

For example, a subscription charge may impact various reports for requests for data in an enterprise-wide Customer Relationship Management (CRM) system, such as a billing record system, a revenue tracking system, and/or a report generating system. As such, a single subscription charge may be used to impact more than one other subsystem. Similarly, a one-time sales order may have similar impact on the aforementioned subsystems. As such, each subsystem must be programmed to interface with multiple types of charges, and therefore, multiple customized interfaces are maintained by a single business entity across the disparate ways in which charges are generated, tracked and saved. Such a one-to-one customization across multiple subsystems is inefficient and prone to error.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

Figure 1:
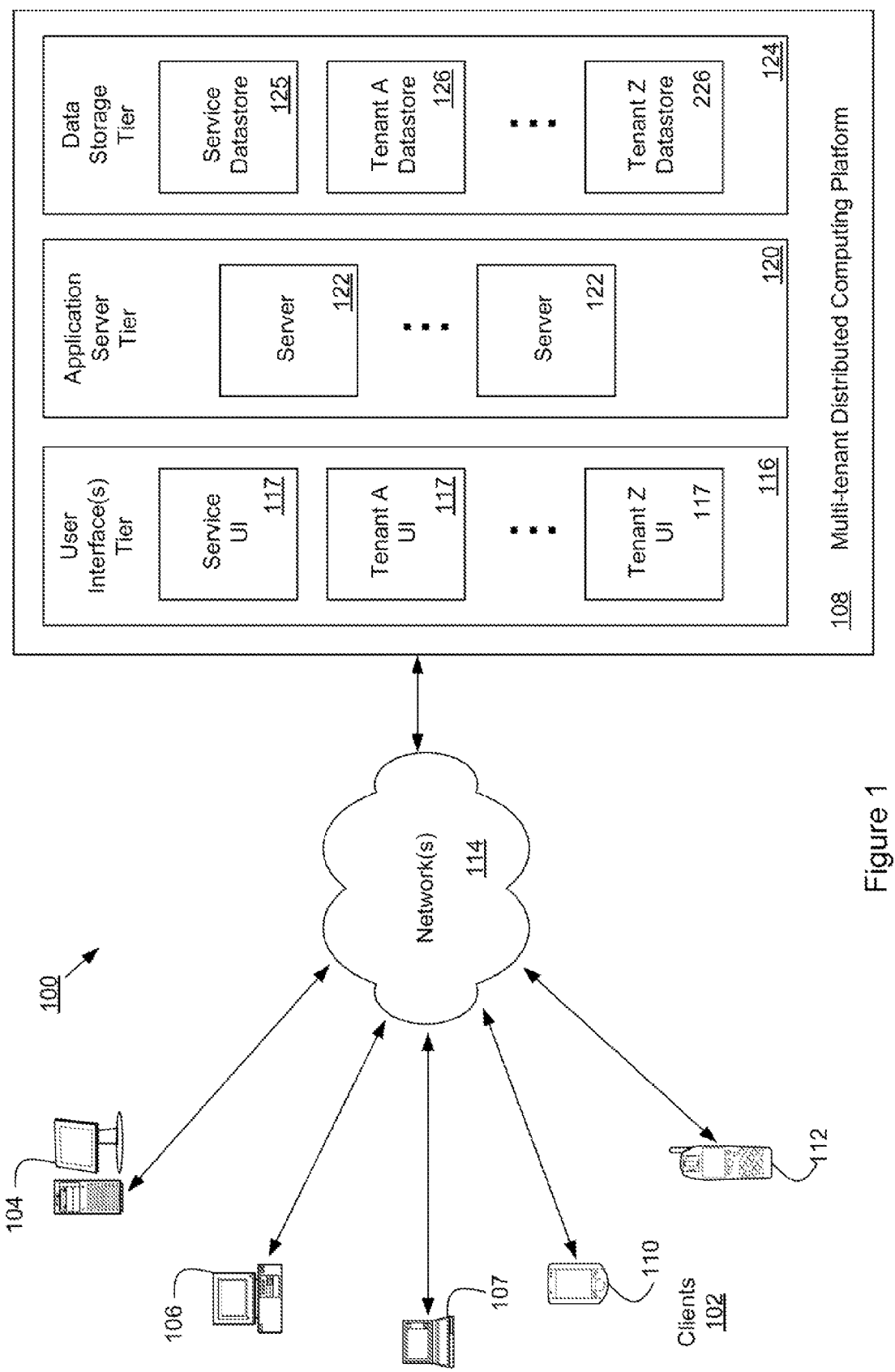
FIG. 1 is a diagram illustrating a system, including an integrated business system and an enterprise network in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the subject matter may be implemented in the context of a multi-tenant, "cloud" based environment (such as a multi-tenant business data processing platform), typically used to develop and provide web services and business applications for end users. This exemplary implementation environment will be described with reference to FIGS. 1-3 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

As discussed in the background, in order to ensure a consistent quality of service for the tenants, a multi-tenant, distributed, computing platform (hereinafter, platform) may need to restrict the ability of one operation to consume excessive resources to the detriment of other operations that are executing at the same time (where the resources in question are primarily processing (CPU) time and memory (RAM)). One possible approach to this problem is to begin a timer upon when a data processing operation begins and to SIMPLY terminate the operation if and when the timer expires. While this would prevent excessive use of resources, the approach has multiple drawbacks: it does not restrict access to RAM; it penalizes operations (e.g., scripts) that spend time waiting for an external result to be returned (during which time they are not utilizing any CPU time); and terminating the operation of a single operation in a multi-threaded application requires the system to be built with termination in mind (which is difficult for the platform and not enforceable for any customized operations that may run on top of the platform if the platform is flexible).

Another possible approach is to run a separate instance of the platform for each tenant/customer, wherein each instance includes process-wide resource limits set to prevent interference with other instances that may be executing using the same computing resources. This makes each instance substantially equivalent to a single-tenant platform, thereby negating many of the benefits of multi-tenant platforms, including reduced hardware and management overhead. These solutions have drawbacks as are evident in the discussion below with regard to embodiments of the subject disclosed next and in particular with regard to tenants/customer who may wish to customize operations to meet specific needs.

By way of overview, the subject matter disclosed herein is directed to methods, systems, and apparatuses for improving the handling and interaction of charge events in a business using services of a multi-tenant computing platform, such as accounting, CRM, ERP, and the like. Embodiments are directed to implementing and using a data record termed a "charge record" to enable efficient use of charges originating from multiple sources to generate reports and forecasts for multiple other services and/or recipients. In one embodiment, the charge record defines a single-source of data which enables maintaining critical business information in synchronization through a single repository of data. One aspect of the inventive concept is to define a single abstraction, the charge record, which all sources can create. From the charge record, a variety of back office business processes are supported including billing, revenue recognition, reporting, and forecasting. Thus, instead of multiple relationship between multiple sources and multiple processes, a charge record provides a single data point for a charge such that charges sources and processes that utilize data from the charge sources may interact using a single type of data record. Other objects and advantages will be apparent to one of ordinary skill in the art upon review of the detailed description of the present invention and the included figures.

FIG. 1 is a diagram illustrating elements or components of an example operating environment in which an embodiment may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment, the distributed computing service/platform 208 may be a multi-tenant and service platform 108 and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. However, one challenge in such multi-tenant platforms is the ability for each tenant to tailor their instantiation of the integrated business system to their specific business needs. In one embodiment, this limitation may be addressed by abstracting the modifications away from the codebase and instead supporting such increased functionality through custom transactions as part of the application itself. Prior to discussing additional aspects of custom transactions, additional aspects of the various computing systems and platforms are discussed next with respect to FIG. 2.

Figure 2:
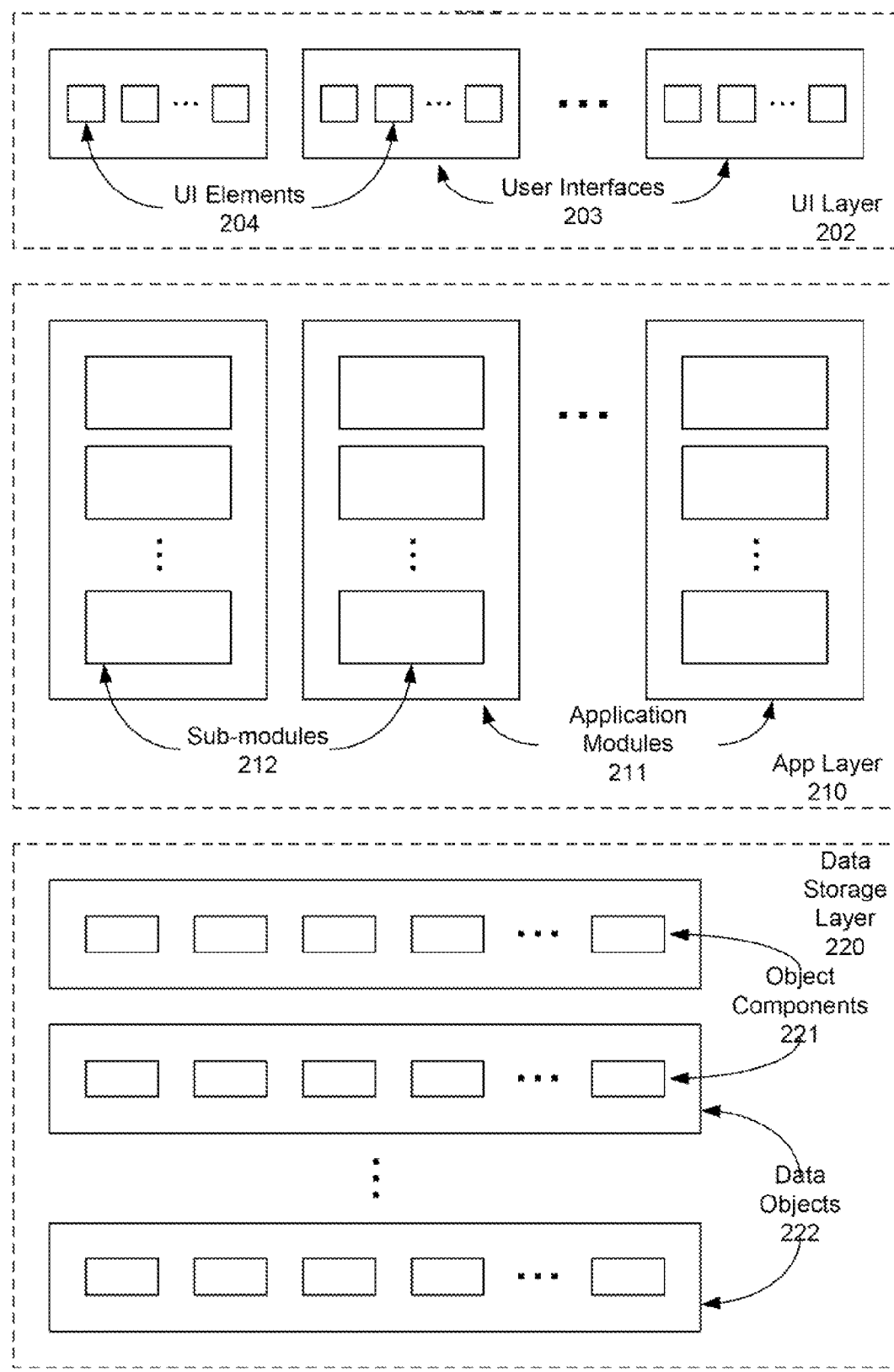
FIG. 2 is a diagram illustrating elements or components of an example operating environment in which an embodiment of the subject matter disclosed herein may be implemented.

FIG. 2 is a diagram illustrating additional details of the elements or components of the distributed computing service platform of FIG. 1, in which an embodiment may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the multi-tenant distributed computing service platform of FIG. 1 are shown, in which an embodiment may be implemented. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 210 may include one or more application modules 211, each having one or more sub-modules 212. Each application module 211 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

establishing a charge record having attributes relating to data about a charge;

populating a charge record with data from a source of a charge such that the data about a charge may be stored in attributes of the charge record; and retrieving data from a charge record by a process suited to assemble data about charges stored in one or more charge records.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 2) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Figure 3:
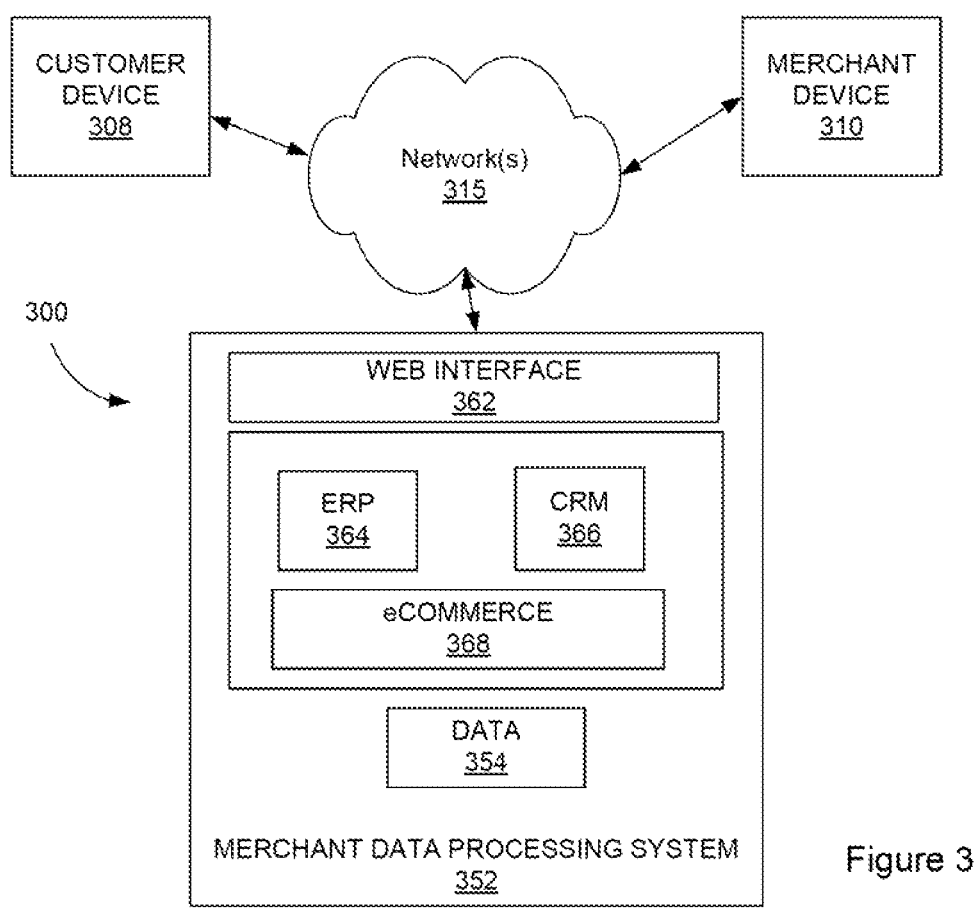
FIG. 3 is a diagram illustrating additional details of the elements or components of the multi-tenant distributed computing service platform of FIG. 2, in which an embodiment of the subject matter disclosed herein may be implemented.

FIG. 3 is a diagram illustrating another perspective of a computing or data processing environment 300 in which an embodiment may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications that provide services and functionality to customers or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a database) that can be accessed remotely over a network. Although further examples below may reference the example computing environment depicted in FIGS. 1-3, it will be apparent to one of skill in the art that the examples may be adapted for alternate computing devices, systems, and environments.

Figure 4:
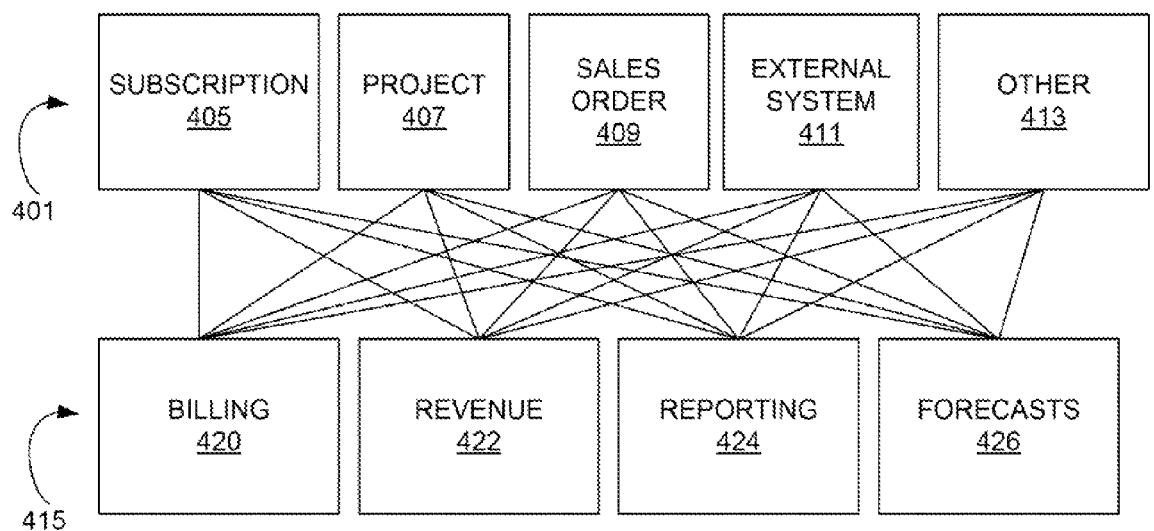
FIG. 4 is a diagram illustrating the possible disparate relationships between possible sources of charges and possible uses of the charges to generate information about a business.

Turning to the next figures, FIG. 4 is a diagram of a conventional system 400 illustrating the possible disparate relationships between possible sources of charges and possible uses of the charges to generate information about a business. In this illustration, several different sub modules in a system, referred to collectively as charge processes 401, may be available for a user of the overall merchant data processing system 352 (FIG. 3). Among the charge processes illustrated are a subscription type charge 405, a project type charge 407, a sales order type charge 409, an external system type charge 411, and other type charges 413. These processes 401 may be available for a user to define specific types of charge events with respect to amounts, time, recurrence, and the like. For example, a subscription type charge 405 may be recurring whereas a sales order charge 409 may be a one-time event. A project type charge 409 may be dependent on a completion of a project whereas an external event type charge 411 may be an immediate charge without any dependency. Several differences may exist between such kinds of charge processes 401 and underlying respective charges. This results in disparate ways in which other services and software may interact with these charge events.

As a result of the many differing ways in which charge data may be characterized, other data manipulation processes 415 may need to have a specific programming interface for interacting with charge data for the various charge processes. In a typical merchant data processing system 352, various data manipulation processes 415 may include a billing process 420, a revenue process 422, a reporting process 424, and a forecasting process 426. Each of these data processes 415 may utilize data from various charges in different ways. For example, a billing process 420 may handle a recurring bill of a subscription differently than a one-time sales order. A revenue process 422 may recognize revenue from a charge event only after it occurs whereas a forecasting process 426 may recognize charge events of subscriptions or projects yet to be billed.

Another supported data manipulation process may include costing. As the charge record and the charge engine are a way of "valuing" certain inputs, such inputs can be valued at the cost to the business. That is, the value of the charge corresponds to an amount that the business may bill to an end customer or how much revenue can be recognized within an overall bill.

In reporting and forecasting, data manipulation process may include cost forecasts corresponding to expected costs based on a stream of forecast cost charges, forecast billings corresponding to expected billings based on a stream of forecast billing charges and an associated invoicing schedule, and forecast revenue corresponding to expected revenue based on a stream of forecast revenue charges. Various reports and forecasts may also include what-If scenarios. Since there can be multiple streams of forecast charges, the system can support representing multiple possible expectations for future performance. Then, reports can show best-case, worst-case, expected value and other scenarios without needing to know any of the domain-specific details.

The end result of these disparate charge processes 401 and data process 415 is a different programmatic interface required between any one charge process and any one data process. Therefore, each connecting line in FIG. 4 illustrates a separate programmatic interface required for proper handling and manipulation of the various unique process-to-process relationships that may exist between modules and sub-modules of the merchant data processing system 352. Thus, using conventional systems, it is complicated and inefficient to reconcile billing, revenue, reports and forecast data that are coming from multiple sources for charge data.

Figure 5:
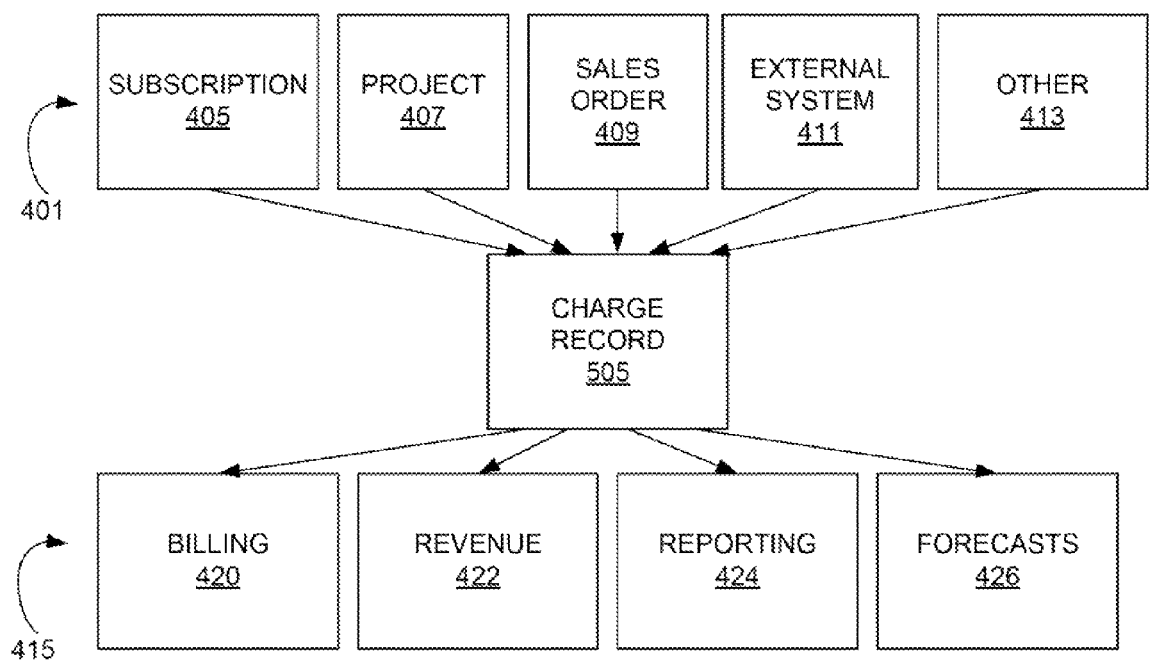
FIG. 5 is a diagram illustrating relationships between possible sources of charges, a charge records or records, and possible uses of the charge record(s) to generate information about a business, and that may be used when implementing an embodiment of the subject matter disclosed herein.

FIG. 5 is a diagram illustrating relationships between possible sources of charges, a charge records or records, and possible uses of the charge record(s) to generate information about a business, and that may be used when implementing an embodiment of the subject matter disclosed herein. In FIG. 5, a charge record 505 may be created and used to store data about a charge from one of the charge processes 401 as discussed above. Thus, when a charge process 401 (e.g., a subscription charge 405, a project charge 407, a sales order charge 409, an external system charge 411, and other charges 413) creates charge data, such charge data may be stored in a charge record 505.

The charge record 505 may have several attributes for storing various data that may be associated with a charge such that any kind of charge data may be stored in a single version of a charge record. Of course, each charge event may not generate data to fill each attribute of a charge record. For example, a sales order charge may not have a frequency of recurrence in the manner that a subscription charge has. Regardless, each data process 415 may not need to know whether or not a frequency of occurrence attribute is available for each record as some data processes 415 may only need data such as an actual revenue from charges as of a current data, such as with a revenue process 422. With a charge record that includes data in attributes that is necessary, each data process 415 needs only to access data as needed in an expected attribute. In this manner, the single version of a charge record 505 simplifies the data exchange between data population from a charge process 401 and data retrieval from a data process 415.

Thus, a charge record 505 (and related systems and methods) assist in facilitating a back office support system (BOSS) centered on the charge record 505. Thus, each charge record may have an equivalent number of attributes such that any data retrieval may be mapped to one type of record, i.e., a charge record. From the charge record 505, a variety of back office business processes are supported including but not limited to, billing, revenue recognition, reporting, and forecasting. With various embodiments, a single-source of data, the charge record 505, now makes it possible to keep critical business information in synchronization and to process such charge data more efficiently.

A charge record 505 may include attributes as discussed above. Such attributes may include attributes (as denoted in the "field" column) noted in the following chart:

| Field | Description | Field Change | Field Edit |
| --- | --- | --- | --- |
| Customer | The customer responsible for this charge. | When the customer is set, the system will update the subsidiary field with the subsidiary of the customer | |
| Subsidiary | The legal entity of the operating business responsible for this customer relationship. | When the subsidiary is set, the department and class will respect the subsidiary | |
| Item | The item or account against which this charge was incurred. | When the item is selected, the system will default in the sale units of measure | |
| Charge Stage | Option for indicating 'Non-Billable' or 'Non-Invoice able' | | |
| Department | Indication of a specific department with an organization | | When set, Department indication is required under accounting preferences. |
| Class | Indication of a specific class with an organization | | When set Class indication is required under accounting preferences. |
| Location | Indication of a specific location with an organization | | When set Class indication is required under accounting |
| Units: | Unit of measure for the usage based charges | | |
| Memo: | Captures any additional details related to the charge | | |
| Service Start Date: | The start date of the service period that the charge represents | | |
| Service End date: | The end date of the service period that the charge represents | | |

Advantages of having a charge-centric record 505 available for use by various data processes are abundant. For example, the system could reduce billable time entered against a project into a set of charges that could enable revenue recognition at month end, an invoice at end-of-quarter, and regular revenue forecasting reports in advance.

In another advantage, users can create their own domain-specific applications on top of this system, and then have their charges treated like any other charge in the system and billed alongside existing defined domains. For example, a merchant data processing system 352 may natively support creating charges for work done against a project. Therefore, the system 352 may determine time entered by employees and create sets of charges based on rules that determine the value of such charges. A given business, however, may have additional components to costs and billing. For example, perhaps a business rents equipment whenever there is work on a project, and the business charges for that rental based rental time (length) of the equipment and how long the business actually has the rental "turned on" or "in use." The business may define additional parameters on top of native services to value and create charges for such rentals; then, related non-rental charges may be billed in standard invoices alongside the time-based rental charges. Such data may also be used in revenue recognition processes and forecast reports.

By way of non-limiting example, such mixed rental/non-rental charge records may be created and manipulated as described in the following paragraphs. This is based on an example wherein is a company that bills for time worked also needs to rent equipment for its services and has a complicated model for billing for such rentals.

As a first step, a sales person may sell a deal to a customer in the form of an agreement. The agreement may stipulate that general time worked will be billed at $10/hour with exceptions that time worked by a partner will be billed at $20/hour and time worked by anyone on the weekends will be billed at $25/hour. The applications and modules to create charges that reflect this pricing rule may be built in to the merchant data processing system 352 system, as part of the billable time functionality. Further, the overall service to this customer in this agreement may also require rental of chargeable equipment billed at $10/day for the duration of the project plus $10/hour for each hour that the equipment is in use.

In operation after the agreement is in place and charge records established by collecting and storing charge data, employees and partners may enter time into a time-keeping system within the merchant data processing system 352 according to such agreement. In this example, a first employee named Bob may enter eight hours of regular time in a first month of August such that the system creates an $80 charge (8*10). In a second month of September, Bob may enter four hours of time on Sunday such that the system creates a $100 charge (4*25). Further, a second employee named Mary, a partner, may enter two hours of regular time such that the system creates a $40 charge (2*20). Further yet, a piece of equipment may be rented for five days in August resulting in the system creating a $50 charge (1*5*10) and rented for five days in September also resulting in the system creating a $50 charge (1*5*10). Finally, Bob may operate the equipment for eight hours in August and four hours in September resulting in the system creating charges of $80 (8*10) and $40 (4*10), respectively. Mary operates the equipment for two hours in August resulting in the system creating a charge of $20 (2*10).

Each of the above scenarios may be stored in a single charge record or group of related charge records. In this manner, the data described above may be stored in an attribute field of a charge record such that uniformity across disparate types of charges may be maintained. Thus, a charge record for Bob's time may be created to track and store Bob's time, a charge record for Mary's time may be created and stored to track Mary's time, a charge record may be created to track and store the equipment rental time, and a charge record may be created and stored to track equipment use.

Then, various data manipulation processes may retrieve the tracked data. Thus, in revenue recognition, a business can recognize all of the work performed in the given accounting period. August revenue received will be $210 (sum of all August charges). September revenue received will be $250 (sum of all September charges). Further, in billing, a billing clerk may create a single invoice for $460, including all 6 charges above.

As mentioned above, a merchant data processing system 352 may also support domain-specific sources for charges, including:

Billable Time: This may be the total time billed by a record-keeper, a group of record-keepers, a project, a business, and the like.

Billable Expenses: This may be the total expenses billed by a record-keeper, a group of record-keepers, a project, a business, and the like.

Project Progress: This may be generally a percent of the total fixed bid value of a project based on hours work, billed over a regular time interval (e.g. monthly).

Project Milestones: Generally, these may be fees associated with the completion of a task or set of tasks in a project plan.

Date-Based Charges: These may be total date-based charges billed by a record-keeper, a group of record-keepers, a project, a business, and the like.

Subscription and Recurring Charges: These may be any kind of recurring expense, such as the service component of a phone/cable/utility bill.

Usage-Based Charges: These may be any usage-derived expense, such as the component of an electric bill that is based on how many kilowatt hours were used during a given period.

Item Fulfillment/Deliveries: This may be the amount charged for selling an item to a customer.

In addition, users may define their own applications that track domain-specific data and the logic for translating it to charges. For example, a business may define its own custom records and custom rules for valuing rented equipment. As mentioned in the example above, users may define an arbitrarily complex model for pricing and billing equipment they have to rent, and it would appear seamlessly within the system as if it were natively supported. Further, a business may define additional complicated pricing models for natively supported items. That is, users may wish to define their own way of associating a value with the above inputs that may be handled easily by providing a custom rule for determining the charge associated with a given input.

Aspects of the charge record as described above may be used in conjunction with additional elements of an overall workflow. As discussed next, the charge record may be used with an agreement element, ratable events, and usage ratings to provide users with data about rates, revenue, billing, projections, and other related services with the context of a merchant data processing system 352 (FIG. 3).

Prior to generating a charge record, various data may be used to describe aspects of an agreement between two parties (e.g., the merchant and a customer). The aspects of an agreement may be expressed as an agreement element. The agreement element may include several data elements corresponding to aspects of an agreement, including a billing element, a revenue element, and rate plan element.

For example, on a specific customer project, a customer may be billed $10/hour on the last day of the month, and the revenue may be recognized immediately. Thus, this "agreement" may be expressed by three elements. A first element may be a billing element that includes data corresponding to how ratable events will be billed to the customer, e.g., billed on the last day of the month the bill will be mailed to a specific address. A second element may be revenue element that includes data corresponding to how revenue from ratable events will be recognized, e.g., recognized as soon as the ratable events are invoiced in this case. A third element may be a rate plan element that includes data corresponding to how ratable events that reference this element will be rated, e.g., $10/hour. Thus, a charge record may be influenced by the collection of data in agreement elements.

Further, the ratable event as discussed above may also be a record having additional levels of data. Such ratable events may be an additional level of indirection before the charge record is created or modified in the form of the ratable event record. A ratable event record may be created using additional method steps such as a mediation step, a rating step, a charge creation step, and a planned revenue creation step whish are described next.

A mediation step corresponds to collection of data about the creation of a ratable event from a domain-specific source (e.g., a project milestone, a subscription usage record, and billable time/expense entries). For example, if a user works 10 hours of billable time, there may be a ratable event with a quantity of 10 referencing an associated agreement element. A rating step corresponds to collection of data about the association of the ratable event with a dollar value. In the billable time example, the rating engine may use the agreement element to find a rate plan of $10/hour. Then, the rating engine may apply the rate from the rate plan to the ratable event created by mediation step to get an amount of $100 for the ratable event. A charge manager may invoke a charge creation step for using the agreement element to find the billing account (customer-specific billing details, such as billing cycle dates, billing address, and the like), and apply this collected data to the ratable event to create a charge record, which could then be an input to invoicing, invoice forecasting, and invoice reports as discussed with respect to FIG. 5 above. Further, a planned revenue creation step may also be invoked. Similar to the creation of a charge record, a planned revenue creation step supports billing and its associated historical and forecasting reports. For example, a planned revenue engine may create planned revenue records to support revenue recognition, forecasting, and historical reporting.

A further record that may be created tangential to a charge record is a usage record through a usage rating. This is a specific application of the generalized framework of a charge workflow. Usage records (e.g., phone calls that will be billed) can be imported into the merchant system and then step through mediation, rating, charge creation, and planned revenue creation steps above.

Figure 6:
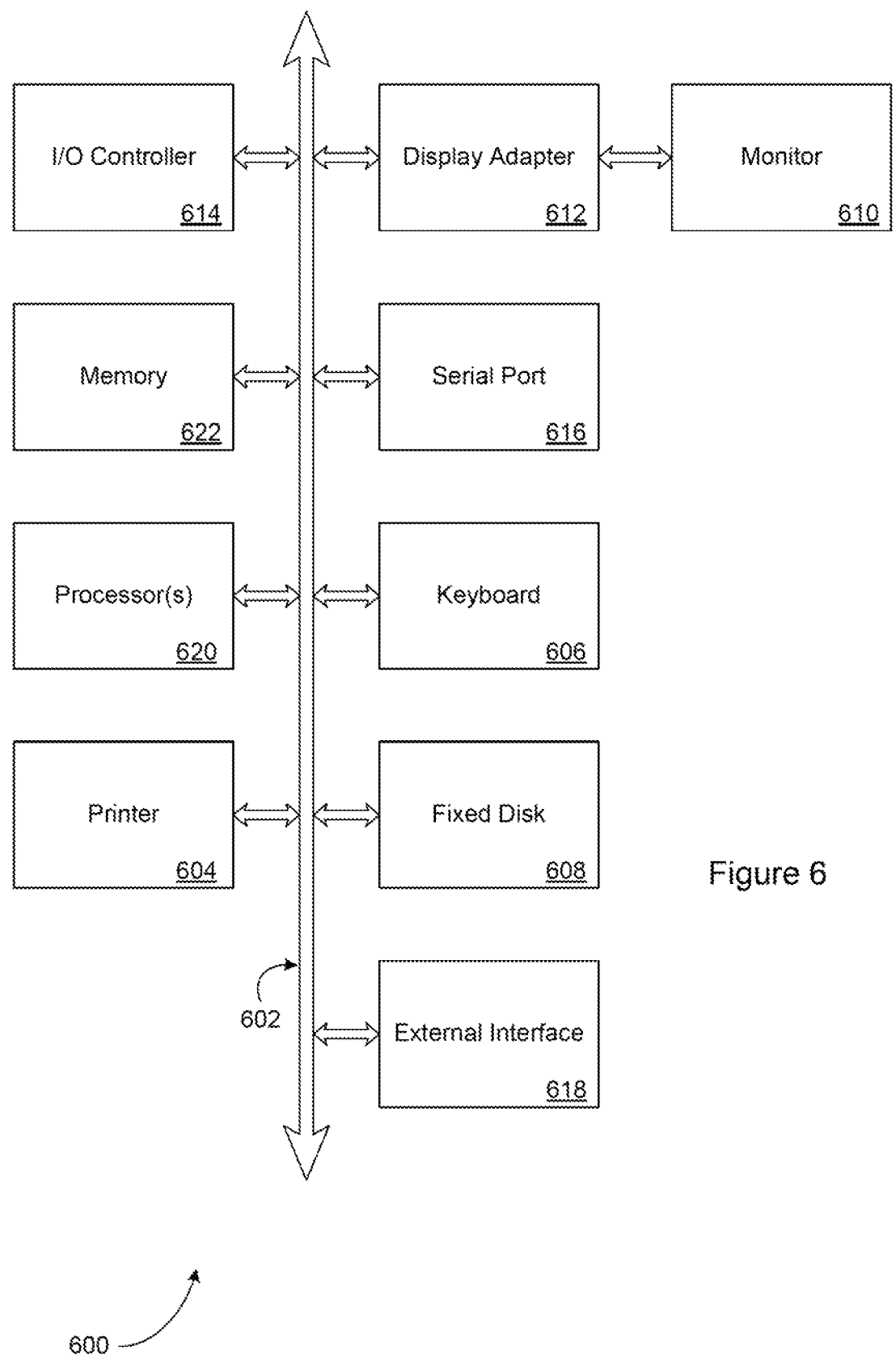
FIG. 6 is diagram illustrating elements or components that may be present in a computer device or system configured to implement a method, process, function, or operation in accordance with an embodiment of the subject matter disclosed herein.

In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A computing system comprising:
   at least one processor connected to at least one non-transitory computer readable medium;
   a plurality of charge modules stored on the at least one non-transitory computer readable medium and having computer instructions executable that, when executed by the at least one processor, cause the computing system to assemble data about a plurality of charges, wherein the plurality of charges correspond to at least one first type of charge having at least one first attribute and at least one second type of charge having at least one second attribute, the second attribute being mutually exclusive with the first attribute;
   a database stored on the at least one non-transitory computer readable medium and coupled to the plurality of charge modules, wherein the database is configured to store the assembled data about the plurality of charges in one or more charge records, and each of the one or more charge records stored by the database is configured as a single version to include common attributes corresponding to a plurality of different charge record data, wherein the common attributes comprise the first attribute and the second attribute; and
   a plurality of data manipulation modules stored on the least one non-transitory computer readable medium, wherein the plurality of data manipulation modules comprise computer instructions executable by a processor to cause the plurality of data manipulation modules to: (i) separately retrieve different portions of the assembled data about the plurality of charges corresponding to the first attribute and the second attribute from the one or more charge records in the database, and (ii) use the separately retrieved portions of the assembled data to generate different user-defined outputs.

2. The computing system of claim 1, wherein the common attributes of a charge record further comprises at least one attribute from a group including: customer identification, subsidiary identification, item identification, charge stage, department, class, location, units of measure, service start date, and service end date.

3. The computing system of claim 1, wherein each charge record stored in the database comprises an equivalent number of attributes.

4. The computing system of claim 1, wherein the plurality of charge modules further comprises at least one charge module from a group including: a subscription charge module, a project charge module, a sales order charge module, and an external system charge module.

5. The computing system of claim 1, wherein the plurality of data manipulation modules further comprises at least one charge module from a group including: a revenue recognition module, a billing module, a reporting module, and a forecasting module.

6. The computing system of claim 1, wherein at least one charge record stored in the database comprises a charge record having more than one type of charge stored therein.

7. The computing system of claim 1, wherein the plurality of charge modules further comprises at least one charge module natively supported in the computing system and at least one domain-specific customized charge module created by a user of the domain.

8. A non-transitory computer-readable medium storing computer-executable instructions that, when executed by one or more processors of a computer system, cause the computer system to:
assemble data about a plurality of charges, wherein the plurality of charges correspond to at least one first type of charge having at least one first attribute and at least one second type of charge having at least one second attribute that is mutually exclusive with the first attribute;
store the assembled data about the plurality of charges in one or more charge records, wherein the one or more charge records are stored within a database coupled to the plurality of charge modules, and each of the one or more charge records stored in the database is configured as a single version to include common attributes corresponding to a plurality of different charge record data;
in response to receiving separate requests for different portions of the assembled data about the plurality of charges corresponding to the first attribute and the second attribute from a plurality of data manipulation modules, separately transmit the requested data about the plurality of charges from the one or more charge records in the database to the plurality of data manipulation modules.

9. The non-transitory computer-readable medium of claim 8, wherein the computer-executable instructions, when executed, further cause the computer system to:
store at least a portion of the assembled data about the plurality of charges in one or more charge records within a second database coupled to the plurality of charge modules, each charge record having a plurality of attributes corresponding to charge record data; and
transmit, to the plurality of data manipulation modules, the portion of the assembled data about the plurality of charges from the one or more charge records in the second database.

10. The non-transitory computer-readable medium of claim 9, wherein the computer-executable instructions, when executed, when executed, isolate access to the database from access to the second database.

11. A computer implemented method, the method comprising:
assembling data about a plurality of charges, wherein the plurality of charges correspond to at least one first type of charge having at least one first attribute and at least one second type of charge having at least one second attribute, wherein the second attribute is mutually exclusive with the first attribute;
storing the assembled data in one or more charge records corresponding to the plurality of charges, the charge records being stored in a database maintained in at least one non-transitory computer readable medium, wherein each charge record is configured as a single version to include having a plurality of common attributes corresponding to charge record data; and
in response to receiving requests for different portions of the assembled data included in the one or more charge records, transmitting the requested portions of the assembled data to different data manipulation modules, wherein the transmitted portions of the assembled data are to be used by the different data manipulation modules to generate different reports.

12. The computer implemented method of claim 11, wherein assembling the data further comprises assembling data corresponding to at least one time-billed charge and at least one equipment-rental charge.

13. The computer implemented method of claim 11 wherein assembling the data further comprises assembling data corresponding to at least one time-billed charge and at least one equipment usage charge.

14. The computer implemented method of claim 11 wherein assembling the data further comprises assembling data corresponding to at least one time-billed charge at a first rate and at least one time billed charge at second rate.

15. The computer implemented method of claim 11 wherein assembling the data further comprises assembling data corresponding to at least one charge at a first rate at a first time and at least one charge at a second rate at a second time.

16. The computer implemented method of claim 11 wherein assembling the data further comprises assembling data corresponding to at least one time-billed charge and at least fixed-cost charge.

17. The computer implemented method of claim 11, wherein the plurality of attributes further comprise at least one attribute of the group including: customer identification, subsidiary identification, item identification, charge stage, department, class, location, units of measure, service start date, and service end date.

18. The computer implemented method of claim 11, wherein transmitting the data comprises transmitting data corresponding to a revenue projection.

19. The computer implemented method of claim 11, wherein transmitting the data comprises transmitting data corresponding to a billing event.

20. The computer implemented method of claim 11, wherein transmitting the data further comprises transmitting data corresponding to a forecasting report.

* * * * *